(12) United States Patent
Enomoto et al.

(10) Patent No.: US 7,299,118 B2
(45) Date of Patent: Nov. 20, 2007

(54) VEHICLE OCCUPANT PROTECTION APPARATUS

(75) Inventors: Takaaki Enomoto, Anjo (JP); Hideki Kato, Nishin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 397 days.

(21) Appl. No.: 10/656,193

(22) Filed: Sep. 8, 2003

(65) Prior Publication Data
US 2004/0080204 A1   Apr. 29, 2004

(30) Foreign Application Priority Data
Oct. 24, 2002   (JP) .............................. 2002-309146

(51) Int. Cl.
G06F 7/00   (2006.01)
A62B 35/00   (2006.01)

(52) U.S. Cl. ........................................ 701/45; 297/480

(58) Field of Classification Search .................. 701/45
See application file for complete search history.

(56) References Cited

U.S. PATENT DOCUMENTS

| | | | |
|---|---|---|---|
| 6,374,168 B1 * | 4/2002 | Fujii | 701/45 |
| 6,758,495 B2 | 7/2004 | Brambilla et al. | |
| 2004/0068354 A1 * | 4/2004 | Tabe | 701/45 |

FOREIGN PATENT DOCUMENTS

| | | |
|---|---|---|
| DE | 44 17 064 A1 | 7/1995 |
| DE | 100 05 010 A1 | 8/2001 |
| JP | A 6-286581 | 10/1994 |
| JP | B2 2715528 | 11/1997 |
| JP | A 2000-190815 | 7/2000 |
| JP | A 2000-211475 | 8/2000 |
| JP | A 200-247210 | 9/2000 |
| JP | A 2001-39268 | 2/2001 |
| JP | A 2001-39269 | 2/2001 |
| JP | A 2001-55105 | 2/2001 |
| JP | A 2002-19555 | 1/2002 |

* cited by examiner

Primary Examiner—Thu V. Nguyen
(74) Attorney, Agent, or Firm—Oliff & Berridge, PLC

(57) ABSTRACT

An occupant protection apparatus appropriately protects occupants of a vehicle, when a vehicle crush occurs, without requiring a troublesome task to the occupants. The occupant protection apparatus is provided with a steering angle sensor, a distance sensor and a brake depressing amount sensor. An electronic control unit predicts a vehicle crash based on the detection signals of each sensor so as to set a tension applied to a driver seat seatbelt to be smaller than a tension applied to passenger seat seatbelts. Additionally, the electronic control unit increases the tension applied to the seatbelts when a temperature detected by an outside-temperature detection sensor and/or an inside-temperature detection sensor is low.

6 Claims, 7 Drawing Sheets

VEHICLE OCCUPANT PROTECTION APPARATUS

BACKGROUND OF THE INVENTION

1. Field of the Invention

The present invention generally relates to occupant protection apparatuses and, more particularly, to an occupant protection apparatus for appropriately protecting occupants of a vehicle by increasing a tension applied to a seatbelt.

2. Description of the Related Art

Conventionally, as disclosed, for example, in Japanese Laid-Open Patent Application No. 2000-55105 (pages 5-7 and FIG. 5), a protection apparatus of this kind protects an occupant of a vehicle by increasing a tension of the seatbelt according to the occupant's physical feature when it is judged that there is a possible crash or impact of the vehicle. In this protection apparatus, the occupant's physical feature is previously stored in a database so that data of each occupant is read out using a fingerprint sensor, an ID card, etc.

However, in the above-mentioned conventional occupant protection apparatus, a large strain may be imposed on an occupant since the occupant is required to input data to the apparatus so as to store the physical feature of the occupant. Moreover, in order to retrieve each occupant's data, it is necessary for each occupant to make a fingerprint check each time or use an ID card, which may be a problem in that each occupant is enforced to do a complicated procedure.

SUMMARY OF THE INVENTION

It is a general object of the present invention to provide an improved and useful occupant protection apparatus in which the above-mentioned problems are eliminated.

A more specific object of the present invention is to provide an occupant protection apparatus which appropriately protect occupants, when a vehicle crush occurs, without requiring a troublesome task to the occupants.

In order to achieve the above-mentioned objects, there is provided according to one aspect of the present invention an occupant protection apparatus for a vehicle, comprising: driver-seat seatbelt tension changing means for changing a tension applied to a driver-seat seatbelt provided to a driver seat of the vehicle; passenger-seat seatbelt tension changing means for changing a tension applied to a passenger-seat seatbelt provided to a seat other than the driver seat; crash predicting means for predicting a crash of the vehicle; and belt tension controlling means for controlling the driver-seat seatbelt tension changing means and said passenger-seat seatbelt tension changing means so as to increase the tension applied to each of the driver-seat seatbelt and the passenger-seat seatbelt when the crash predicting means determines that there is a possibility of a vehicle crash, and set the tension applied to the driver-seat seatbelt to be smaller than the tension applied to the passenger-seat seatbelt.

In the above-mentioned invention, the crash predicting means may be constituted by time predicting means for predicting a time period until the vehicle crashes into an object (vehicle, etc) moving ahead and determining means for determining a possibility of a vehicle crash when the predicted time period is equal to or less than a predetermined short time. Additionally, the crash predicting means may be constituted by distance detecting means for detecting a distance from a front end of a vehicle to an object (vehicle, etc) moving ahead of the vehicle and determining means for predicting a front crash of the vehicle when the detected distance is equal to or smaller than a predetermined short distance.

Moreover, the crash predicting means may be constituted by brake depressing amount detecting means for detecting an amount of depression or travel of a brake pedal and determining means for predicting a front crash of a vehicle when a brake depressing velocity calculated based on the detected amount of depression is equal to or greater than a predetermined velocity. Furthermore, the crash predicting means may be constituted by steering angle detecting means for detecting a steering angle of a steering wheel and determining means for predicting a front crash of a vehicle when a steering angular velocity calculated based on the detected steering angle is equal to or greater than a predetermined angular velocity.

According to the above-mentioned invention, the occupants including the driver and the passenger can be protected from a vehicle crash since the tension applied to each of the seatbelt of the driver seat and seatbelts of the passenger seats is increased when it is determined by the crash predicting means that there is a possibility of a vehicle crash. Additionally, an influence to a driving operation of a driver can be reduced since the tension of the seatbelt of the driver seat is set smaller than the tension of the seatbelts of the passenger seats, thereby permitting the driver to continuously performing the driving operation. Therefore, an attempt can be made to provide an appropriate protection corresponding to each occupant without imposing a procedural burden to each occupant as compared to the conventional technique.

Additionally, there is provided according to another aspect of the present invention an occupant protection apparatus for a vehicle, comprising: occupant belt tension changing means for changing a tension applied to an occupant seatbelt provided to the vehicle; outside-temperature detecting means for detecting a temperature outside the vehicle; crash predicting means for predicting a crash of the vehicle; and belt tension controlling means for controlling the occupant belt tension changing means so as to increase the tension applied to the occupant seatbelt when the crash predicting means determines that there is a possibility of a vehicle crash, and set the tension applied to the occupant seatbelt, when the outside temperature detected by the outside-temperature detection means is a first temperature, to be larger than the tension applied to the occupant seatbelt when the detected outside temperature is a second temperature higher than the first temperature.

According to the above-mentioned invention, in addition to the protection of occupants when a vehicle crash occurs, the tension applied to the seatbelts when the outside temperature is low is increased (the first temperature) as compared to the tension when the outside temperature is high (the second temperature) in accordance with the outside temperature detected by the outside-temperature detecting means. In a case where an occupant wears winter clothes, a time period for removing a slack of the seatbelt is longer than usual due to a compression of the clothes even if the seatbelt tension is increased. For this reason, there is a possibility that a slack of the seatbelt may no be sufficiently removed if the seatbelt tension is increased with the same condition as the case where the occupant does not wear winter clothes. Thus, according to the detected outside temperature, it is assumed that the occupant wears wither clothes when the outside temperature is low and the tension applied to the seatbelts is increased. Therefore, the tension applied to the seatbelts can be increased while sufficiently removing a slack of the seatbelts, which results in appropriate protection of occupants while the thickness of clothes is also taken into consideration.

Additionally, there is provided according to another aspect of the present invention an occupant protection apparatus for a vehicle, comprising: occupant belt tension changing means for changing a tension applied to an occupant seatbelt provided to the vehicle; inside-temperature detecting means for detecting a temperature inside the vehicle; crash predicting means for predicting a crash of the vehicle; and belt tension controlling means for controlling said occupant belt tension changing means so as to increase the tension applied to the occupant seatbelt when the crash predicting means determines that there is a possibility of a vehicle crash, and set the tension applied to the occupant seatbelt, when the inside temperature detected by the inside-temperature detection means is a first temperature, to be larger than the tension applied to the occupant seatbelt when the detected inside temperature is a second temperature higher than the first temperature.

According to the above-mentioned invention, the tension of the seatbelts when the inside temperature is low (the first temperature) is increased as compared to that of a case where the inside temperature is high (second temperature) in accordance with the inside temperature detected by the inside-temperature detecting means. Although it differs from the assumption based on the outside temperature with respect to the assumption that an occupant wears winter clothes when the inside temperature is low, the present is the same as the aforementioned invention in that tension of the seatbelts when the inside temperature is low is increased as compared to that of a case where the inside temperature is high in accordance with the detected inside temperature, and the tension of the seatbelts when the assumption is made that the occupant wears winter clothes when the inside temperature is low is increased as compared to that of a case where the occupant does not wear winter clothes. Therefore, also in the present invention, each occupant is appropriately protected while the thickness of clothes is also taken into consideration.

The occupant protection apparatus according to the present invention may further comprise physique detecting means for detecting physique of an occupant, and wherein the belt tension controlling means further controls the occupant belt tension changing means based on the physique detected by the physique detecting means so that the tension applied to the occupant seatbelt is set to be smaller as the detected physique is larger.

Accordingly, in addition to the protection of occupants which also considers the thickness of clothes, the tension applied to the seatbelts is decreased as compared to a case where the physique is large in accordance with the detected physique. That is, it is considered that a force required to constrain an occupant to each of the seats with the corresponding seatbelts is proportional to the physique of the occupant. Accordingly, when an occupant is a child and if the tension applied to each of the seatbelts is uniformly increased in the same manner as a case where the occupant is an adult, there is a possibility that too much binding load is applied to the child, which may result in insufficient protection to the child. Thus, the tension of the seatbelts is decreased when the weight of the occupant is small in response to the detected physique. Thereby, each occupant can be appropriately protected in accordance with their physique.

Additionally, there is provided according to another aspect of the present invention an occupant protection apparatus for a vehicle, comprising: occupant belt tension changing means for changing a tension applied to an occupant seatbelt provided to the vehicle; belt wear detecting means for detecting wear of the occupant seatbelt; crash predicting means for predicting a crash of the vehicle; and belt tension controlling means for controlling the occupant belt tension changing means, when it is judged by the crash predicting means that there is a possibility of a vehicle crash and also when wear of the occupant seatbelt is detected by the belt wear detecting means, so as to increase the tension applied to the occupant seatbelt.

According to the above-mentioned invention, the tension applied to the seatbelts is increased on the condition that it is determined that there is a possibility of a vehicle crash and also wear of the seatbelts is detected. Therefore, when the seatbelts are not worn, the tension control of the seatbelts is prohibited. For this reason, generation of abnormal noise is prevented, which may occur in the control of the seatbelts that are not worn, and failure and deterioration in the occupant belt tension changing means can be avoided.

Additionally, there is provided according to another aspect of the present invention an occupant protection apparatus for a vehicle, comprising: occupant belt tension changing means for changing a tension applied to an occupant seatbelt provided to the vehicle; belt wear detecting means for detecting wear of the occupant seatbelt; child seat detecting means for detecting attachment of a child seat to a passenger seat of the vehicle; crash predicting means for predicting a crash of the vehicle; and belt tension controlling means for controlling the occupant belt tension changing means, when it is judged by the crash predicting means that there is a possibility of a vehicle crash and when wear of the occupant seatbelt is detected by the belt wear detecting means and also when attachment of the child seat is not detected by child seat detecting means, so as to increase the tension applied to the occupant seatbelt.

According to the above-mentioned invention, the tension applied to the seatbelts is increased on the condition that it is determined that there is a possibility of a vehicle crash, wear of the seatbelts is detected and also attachment of a child seat is not detected. Therefore, when the seatbelts are not worn, the tension control of the seatbelts is prohibited. Accordingly, generation of abnormal noise is prevented, which may occur in the control of the seatbelts 11$b$-11$d$ that are not worn, and failure and deterioration in the occupant belt tension changing means can be avoided. On the other hand, when a child seat is attached, an execution of the tension control of the seatbelts to which a child seat is not attached is prohibited. Thus, the tension control of the seatbelts that do not require the control is prohibited, and failure and deterioration in the belt tension changing means can be avoided.

Other objects, features and advantages of the present invention will become more apparent from the following detailed description when read in conjunction with the accompanying drawings.

DETAILED DESCRIPTION OF THE PREFERRED EMBODIMENTS

First Embodiment

Figure 1:
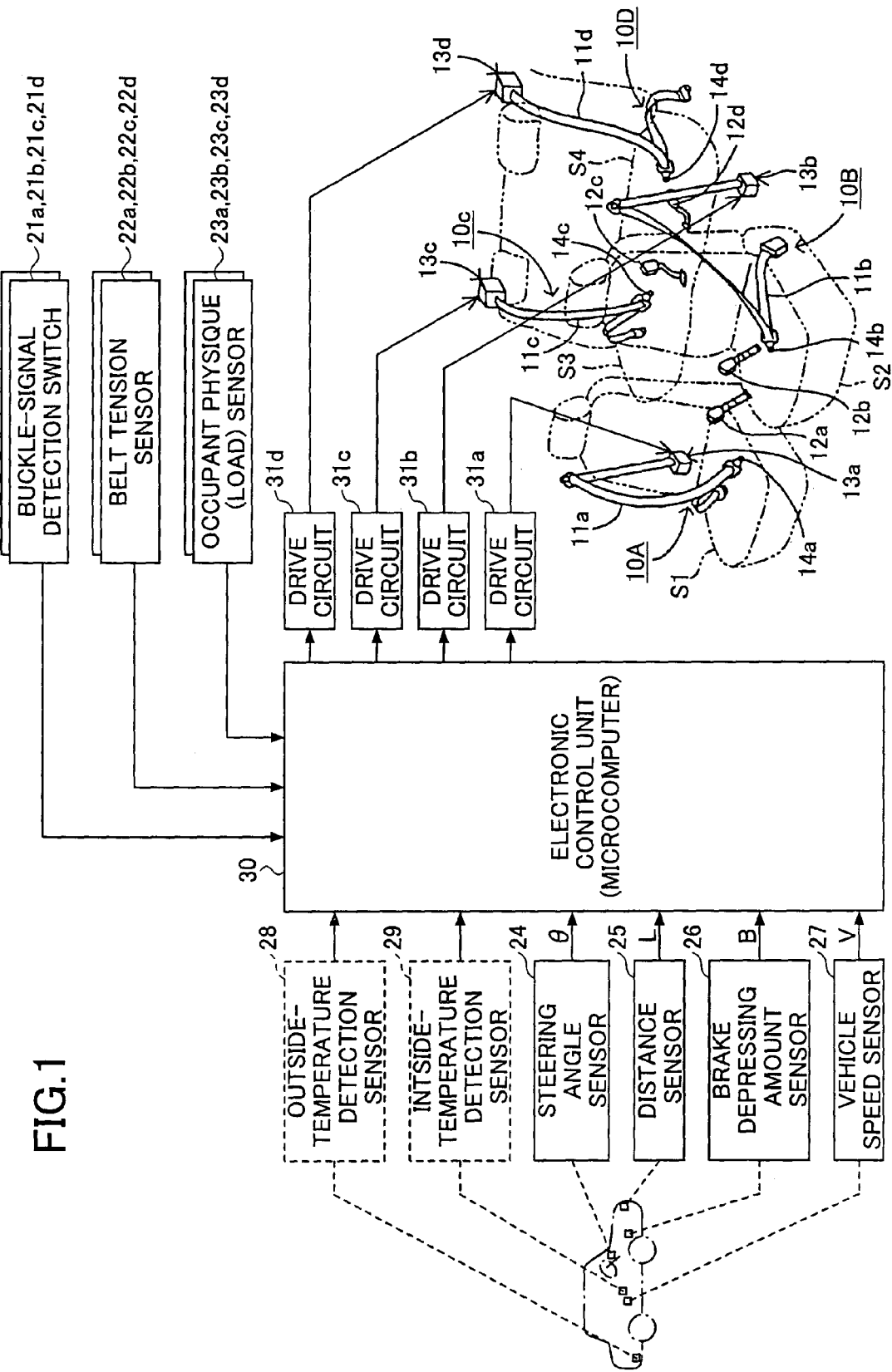
FIG. 1 is a block diagram of an occupant protection apparatus according to first to third embodiments of the present invention.

A description will now be given, with reference to the drawings, of a first embodiment of the present invention. FIG. 1 is a block diagram showing a vehicle occupant protection apparatus according to the first embodiment of the present invention. The occupant protection apparatus shown in FIG. 1 increases a tension applied to a seat belt of each occupant at the time of a vehicle crash. The occupant protection apparatus comprises a driver's seat seatbelt apparatus 10A, a front passenger seat seatbelt apparatus 10B, a rear right seatbelt apparatus 10C, and a rear left seatbelt apparatus 10D that are provided to respective occupant seats S1, S2, S3 and S4.

A description will be given of a specific structure of the driver seat seatbelt apparatus 10A as an example of each of the seatbelt apparatuses 10A, 10B, 10C and 10D. The driver seat seatbelt apparatus 10A is equipped with driver seat seatbelt 11a, a buckle 12a and a belt take-up device 13a. One end of the driver seat seatbelt 11a is fixed to a vehicle body at a position near a side of the driver seat, and the other end of the driver seat seatbelt 11a enters the belt take-up motor 13a. A tongue plate 14a is attached to an intermediate portion of the driver seat seatbelt 11a. The buckle 12a is attached to a side of the drive seat S1, and the tongue plate 14a can be removably connected to the buckle 12a. The belt take-up device 13a, which constitutes a driver seat seatbelt tension changing means of the present invention, is attached to the vehicle body at a side of the driver seat S1. The belt take-up device 13a comprises an electric motor and a roll-up mechanism for winding the driver seat seatbelt 11a by being driven by the electric motor.

A buckle-signal detection switch 21a is incorporated into the buckle 12a. The buckle-signal detection switch 21a, which functions as a belt wear detecting means, is in an OFF state when a driver do not wear the driver seat seatbelt 11a and in an ON state when a driver wears the driver seat seatbelt 11a. Additionally, a belt tension sensor 22a is incorporated into the belt take-up device 13a. The belt tension sensor 22a detects the rolling-up torque of the electric motor of the belt take-up device 13a so as to output a signal indicating the tension of the driver seat seatbelt 11a. Moreover, an occupant physique (load) sensor 23a is provided to a seat frame of the drive seat S1. The occupant physique (load) sensor 23a functions as a physique detecting means to detect a physique such as a driver's weight.

A structure of each of the front passenger seat seatbelt apparatus 10B, the rear right seatbelt apparatus 10C and the rear left seatbelt apparatus 10D is substantially the same as the structure of the driver seat seatbelt apparatus 10A, and reference numerals with different alphabet signs are given to the corresponding parts and description thereof will be omitted.

Next, a description will be given in detail of an electric control apparatus of the occupant protection apparatus. The electric control apparatus comprises a steering angle sensor 24, a distance sensor 25, a brake depressing amount sensor 26 and a vehicle speed sensor 27 in addition to the buckle-signal detection switches 21a-21d, the belt tension sensors 22a-22d and the occupant physique (load) sensors 23a-23d. The steering angle sensor 24 detects a steering angle of a steering wheel. The steering angle of the steering wheel indicates a neutral state of the steering wheel at "0", a steering amount in a left-hand direction by a negative value, and a steering amount of the steering wheel by a positive value. The distance sensor 25 detects a distance L from a front end of the vehicle to an object (mainly a vehicle) ahead of the vehicle equipped with the distance sensor 25. The brake depressing amount sensor 26 detects an amount of travel of a brake pedal. The vehicle speed sensor 27 detects a speed V of the vehicle.

The buckle-signal detection switches 21a-21d, the belt tension sensors 22a-22d, the occupant physique (load) sensors 23a-23d, the steering angle sensor 24, the distance sensor 25, the brake depressing amount sensor 26 and the vehicle speed sensor 27 are connected to an electronic control unit 30.

Figure 2:
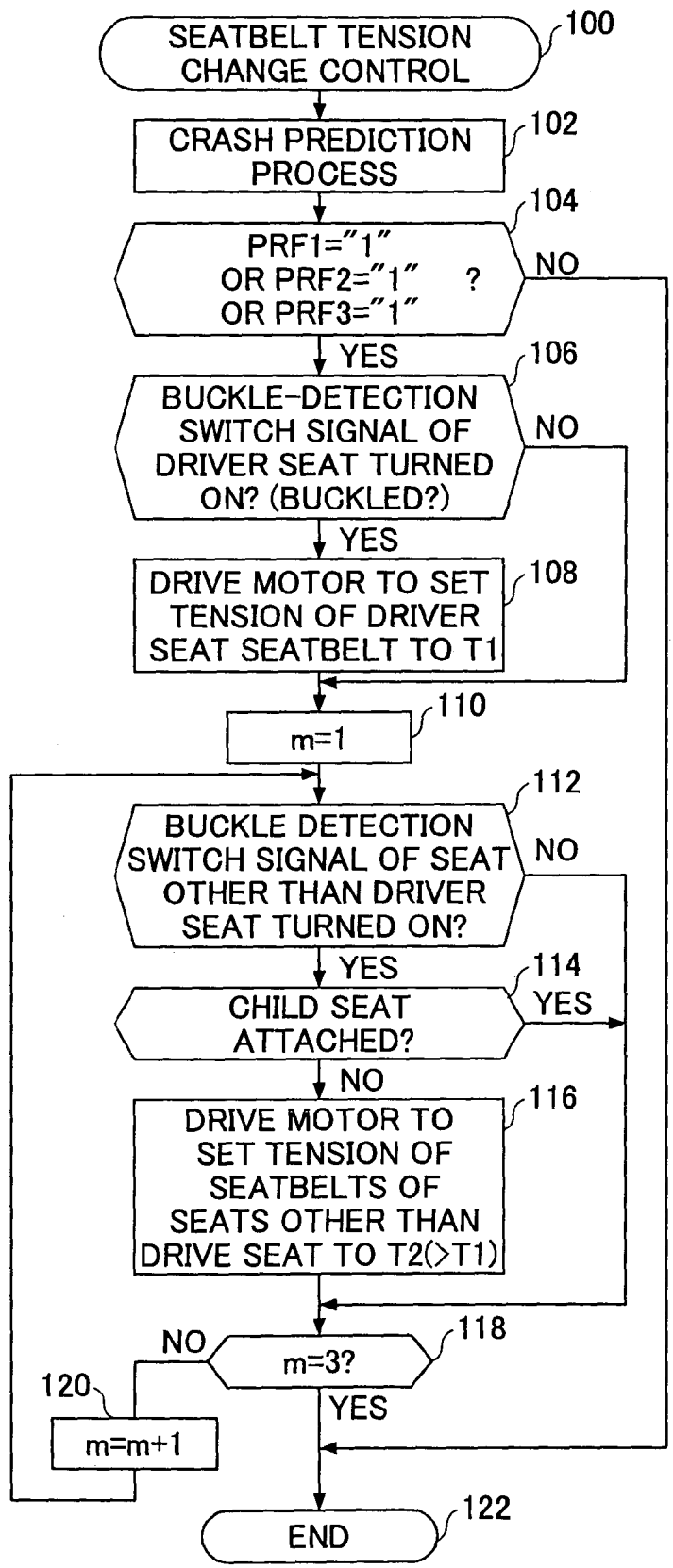
FIG. 2 is a flowchart of a seatbelt tension change control program executed by an electronic control unit shown in FIG. 1 according to the first embodiment of the present invention.

The electronic control unit 30 uses as a main structural component part a microcomputer, which comprises a CPU, a ROM, a RAM, a timer, etc. The electronic control unit 30 controls the tension applied to each of the seatbelts 11a-11d in the driver seat seatbelt apparatus 10A, the front passenger seat seatbelt apparatus 10B, the rear right seatbelt apparatus 10C and the rear left seatbelt apparatus 10D by executing a seatbelt tension change control program shown in FIG. 2 for each predetermined short time. Drive circuits 31a-31d are connected to the electronic control unit 30. The drive circuits 31a-31d operate the electric motors of the belt take-up devices 13a-13d in response to control signals from the electronic control unit 30, respectively.

Figure 4:
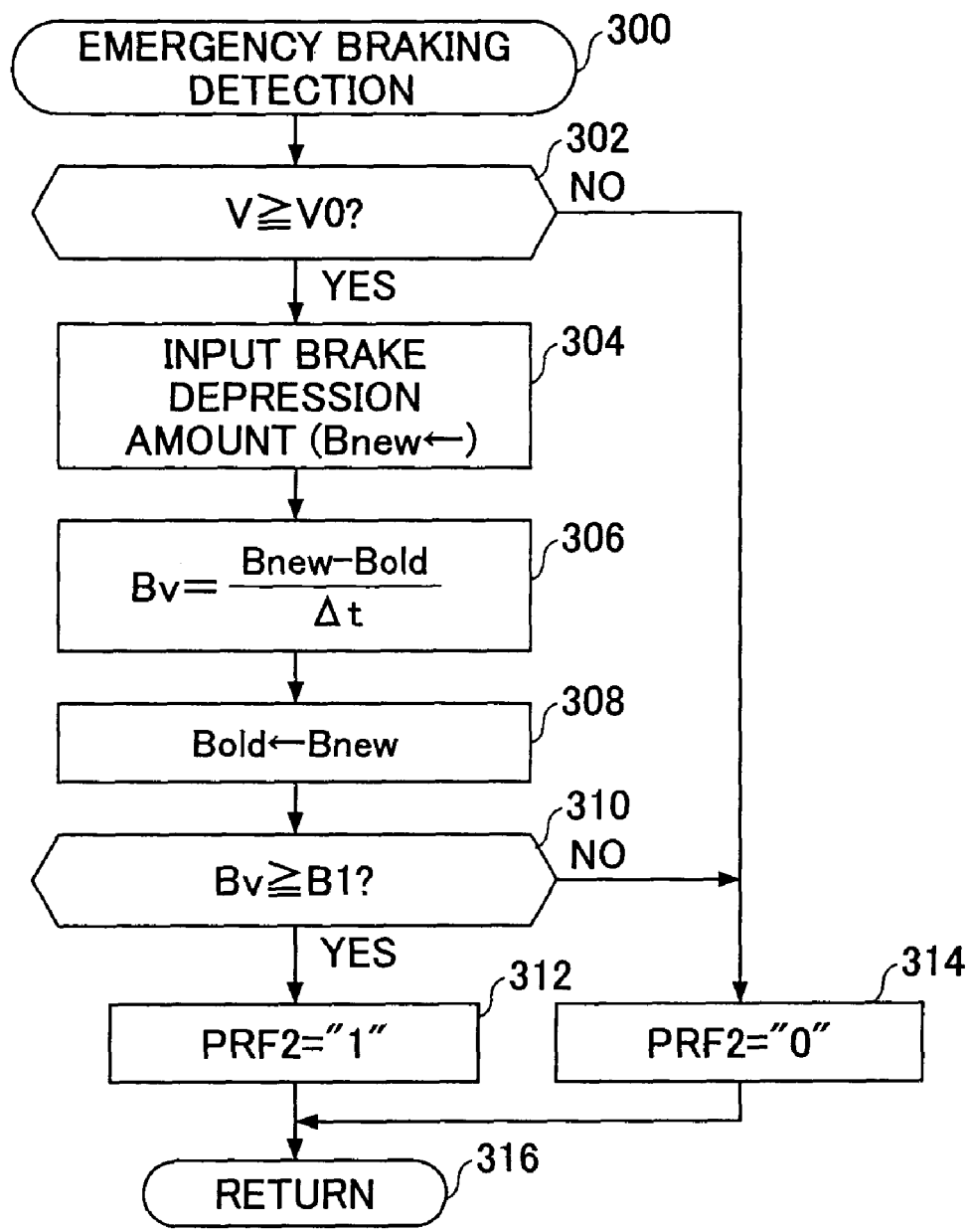
FIG. 4 is a flowchart of an emergency-braking detection program which is one of crash prediction processes performed by the seatbelt tension change control program.
Figure 5:
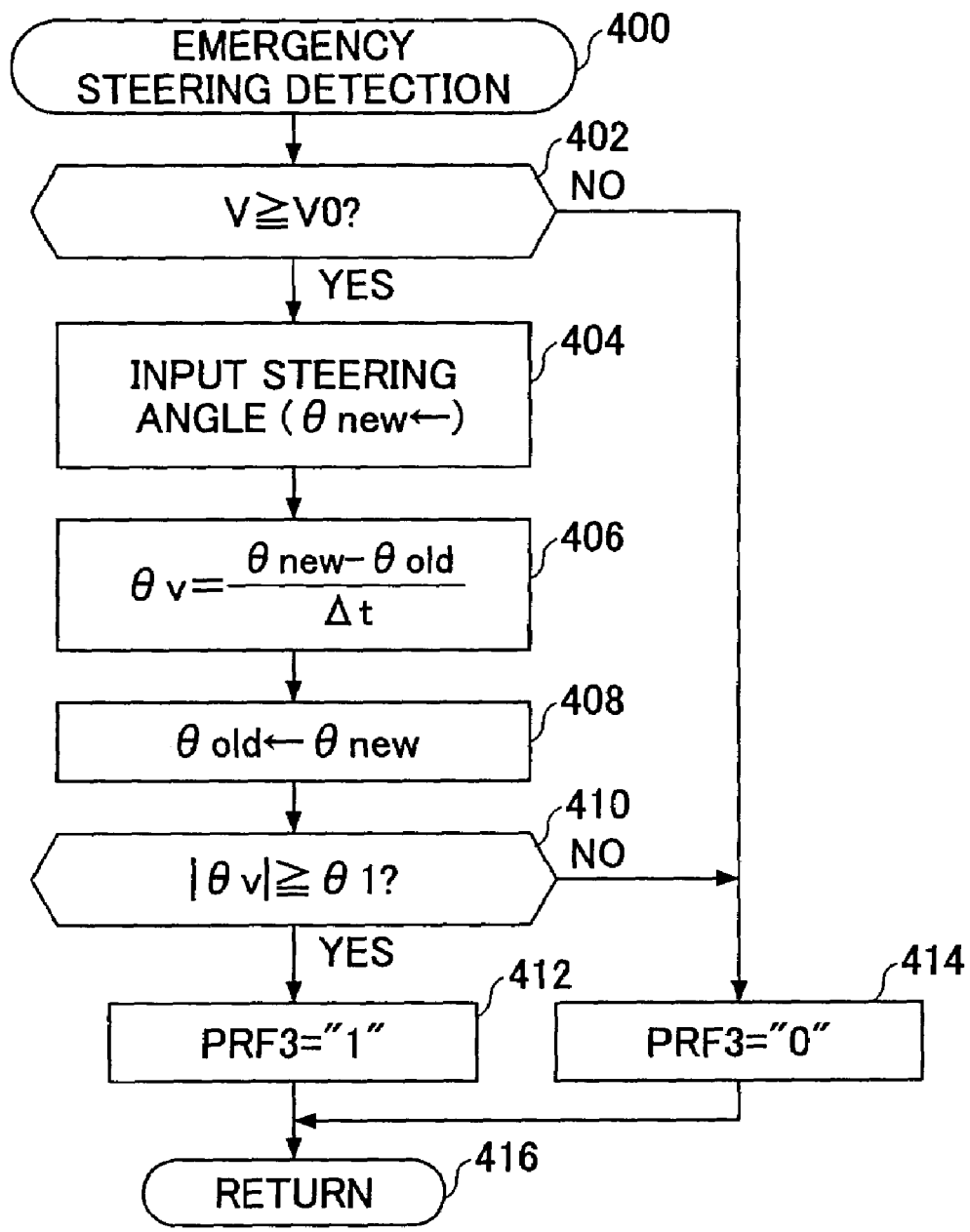
FIG. 5 is a flowchart of an emergency-steeling detection program which is one of crash prediction processes performed by the seatbelt tension change control program.

A description will now be given of an operation of the occupant protection apparatus according to the first embodiment of the present invention. Upon turning on of an ignition switch, which is not shown in the figures, the electronic control unit 30 starts to repeatedly execute the seatbelt tension change control program shown in FIG. 2 for each predetermined short period of time. The execution of the seatbelt tension change control program is started in step 100, and a crash prediction process is performed in step 102. In the crash prediction process, as shown in FIGS. 3 to 5, a crash time detection program, an emergency braking detection program and an emergency steering detection program are performed, respectively.

Figure 3:
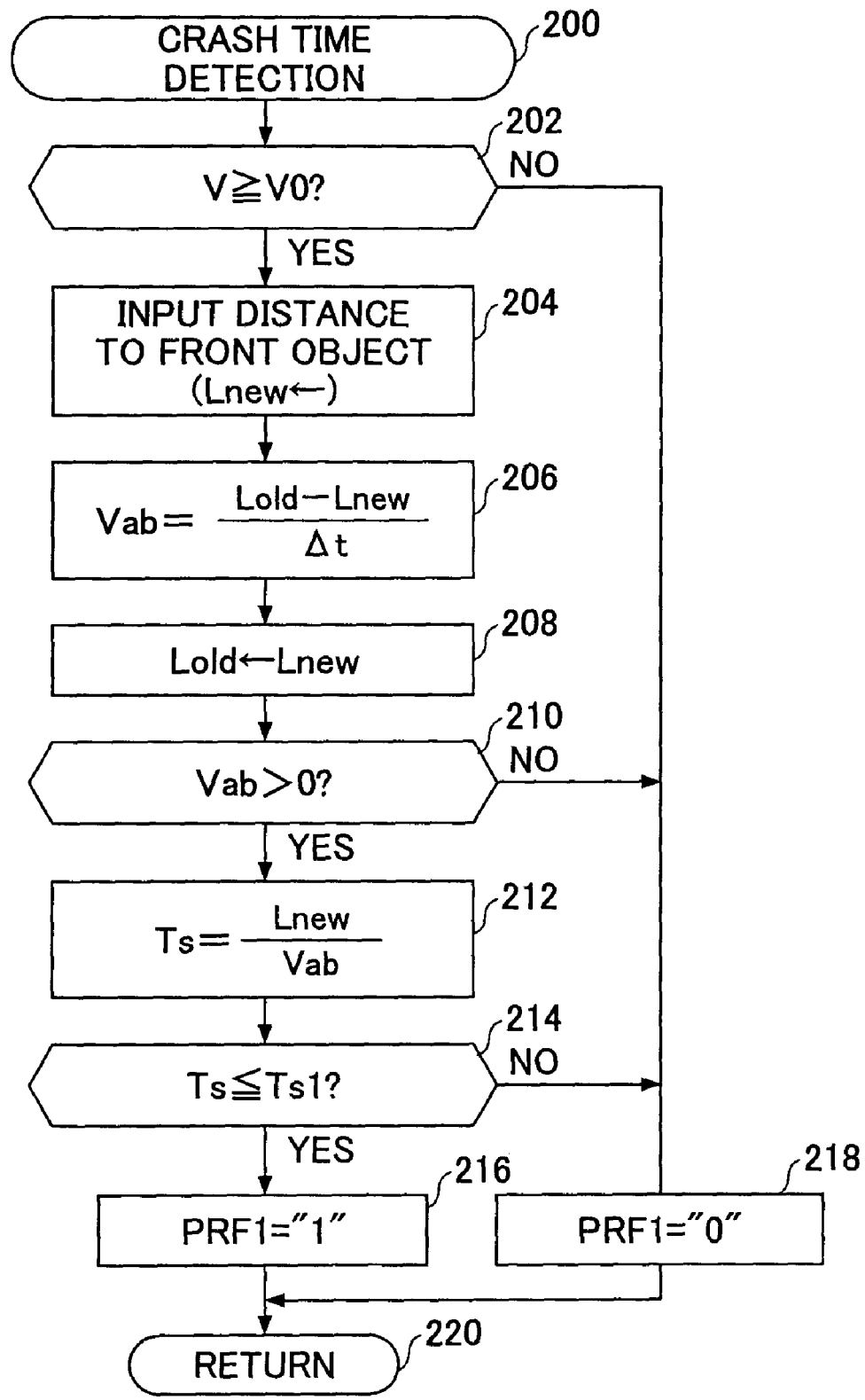
FIG. 3 is a flowchart of a crash time detection program which is one of crash prediction processes performed by the seatbelt tension change control program.

Execution of the crash time detection program is started in step 200 as shown in FIG. 3. A vehicle speed V is input in step 202, and it is determined whether or not the vehicle is moving by determining whether or not the vehicle speed is equal to or greater than a predetermined small value $V_0$. If the vehicle is almost in an idle state where the vehicle speed V is less than the predetermined small value $V_0$, a negative determination "No" is made in step 202, and the routine proceeds to step 218. In step 218, a crash prediction flag PRF1 is set to "0", and the execution of the crash time detection program at this time is ended in step 220.

On the other hand, an affirmative determination "Yes" is made in step 202, that is, if it is determined that the vehicle speed V is equal to or greater than the predetermined small value $V_0$, the electronic control unit 30 performed a process after step 204. In step 204, a distance L from the front end of the vehicle to an object ahead of the vehicle that is detected by the distance sensor 25 is input so as to set the distance L as a current distance Lnew, which represents a distance input by the execution of program at this time.

Next, a relative velocity Vab (=(Lold−Lnew)/Δt) with respect to a front object is calculated by dividing a subtraction value (Lold−Lnew), which is obtained by subtracting the current Lnew from the distance L (hereinafter referred to as a previous distance Lold) input at the last time of execution of the program, by an execution time interval Δt of the crash time detection program.

It should be noted that, last distance Lold has been set as "0" by an initialization setting process which is not illustrated. In this case, the relative velocity Vab calculated at the first time becomes a negative value, and it is judged, in step 210 mentioned later, to be "No", and the routine proceeds to step 218 where the crash prediction flag PRF1 is set as "0". Then, in step 220, the execution of the crash time detection program at this time is ended. For this reason, there is no problem even if the relative velocity Vab calculated at the first time is inappropriate.

After the calculation of the relative velocity Vab, the last distance Lold is updated, in step 208, to the current distance Lnew for a next calculation of the relative velocity Vab. Next, it is determined, in step 210, whether or not the relative velocity Vab is a positive value. If the relative velocity Vab is not a positive value, a negative determination "No" is made in step 210 as mentioned above. Then, the crash prediction flag PRF1 is set as "0" in step 218, and the execution of the crash time detection program is ended in step 220.

On the other hand, if the relative velocity Vab is a positive value, an affirmative determination "Yes" is made in step 210, and the routine proceeds to step 212. In step 212, a time Ts (=Lnew/Vab) is calculated by dividing the current distance Lnew by the relative velocity Vab, the time Ts representing a period of time until a front end of the vehicle reaches the object moving ahead if the vehicle continuously moves at the current relative velocity Vab. Hereinafter, the time Ts is referred to as a front-end impact time. Next, it is determined, in step 214, whether or not the front-end impact time Ts is equal to or smaller than a predetermined time Ts1. The predetermined time Ts1 is set to a value at which there is a certain possibility that the front end of the vehicle reaches the object moving ahead.

If the front-end impact time Ts is greater than the predetermined time Ts1, a negative determination "No" is made in step 214, and the routine proceeds to step 218. In step 218, as mentioned above, the crash prediction flag PRF1 is set as "0", and the execution of the crash time prediction program is once ended in step 220. On the other hand, if the front-end impact time Ts is equal to or smaller than the predetermined time Ts1, an affirmative determination "Yes" is made in step 214, and the routine proceeds to step 216. In step 216, the crash prediction flag PRF1 is set as "1", and the execution of the crash time prediction program is ended.

The execution of the emergency braking detection program is started in step 300 as shown in FIG. 4. In step 302, a vehicle speed V detected by the vehicle speed sensor 27 is input, and it is determined whether or not the vehicle speed V is equal to or greater than a predetermined small value $V_0$, that is, whether or not the vehicle is in a running state. If the vehicle is in almost stopped state and when the vehicle speed V is smaller than the predetermined small value $V_0$, a negative determination "No" is made in step 302, and the routine proceeds to step 314. A crash prediction flag PRF2 is set as "0" in step 314, and the execution of the emergency braking detection program is once ended in step 316.

On the other hand, when the vehicle starts to run and if an affirmative determination "Yes" is made in step 302, that is, if it determined that the vehicle speed V is greater than the predetermined small value $V_0$, the electronic control unit 30 performs a process after step 304. In step 304, a brake depressing amount B detected by the brake depressing amount sensor 26 is input so as to be set as a current depressing amount Bnew which represents an input depressing amount by the current execution of the emergency braking detection program. Next, in step 306, a brake depressing velocity Bv (=(Bnew−Bold)/Δt) is calculated by dividing a subtraction value (Bnew−Bold) by a time interval Δt of execution of the braking detection program, the subtraction value being obtained by subtracting the depressing amount B (hereinafter referred to as a last depressing amount Bold) input in the last execution of the program from the current depressing amount Bnew. After the calculation of the brake depressing velocity Bv, the last depressing amount Bold is updated, in step 308, to the current depressing amount Bnew for the next calculation of the brake depressing velocity Bv.

Then, if a negative determination "No" is made in step 310, that is, if the brake depressing velocity Bv is smaller than a predetermined value B1, the routine proceeds to step 314. In step 314, the crash prediction flag PRF2 is set as "0", and the execution of the emergency braking detection program is once ended. On the other hand, if the brake depressing velocity Bv is equal to or greater than the predetermined value B1, an affirmative determination "Yes" is made in step 310. Then, the crash prediction flag PRF2 is set as "1", and the execution of the emergency braking detection program is ended in step 316.

The execution of the emergency steering detection program is started in step 400 as shown in FIG. 5. In step 402, a vehicle speed V detected by the vehicle speed sensor 27 is input, and it is determined whether or not the vehicle speed V is equal to or greater than a predetermined small value $V_0$, that is, whether or not the vehicle is in a running state. If the vehicle is in almost stopped state and when the vehicle speed V is smaller than the predetermined small value $V_0$, a negative determination "No" is made in step 402, and the routine proceeds to step 414. A crash prediction flag PRF3 is set as "0" in step 314, and the execution of the emergency steering detection program is once ended in step 416.

On the other hand, when the vehicle starts to run and if an affirmative determination "Yes" is made in step 402, that is, if it determined that the vehicle speed V is greater than the predetermined small value $V_0$, the electronic control unit 30 performs a process after step 404. In step 404, a steering angle θ detected by the steering angle sensor 24 is input so as to be set as a current steering angle θnew which represents an input steering angle by the current execution of the emergency steering detection program. Next, in step 406, a steering angular velocity θv (=(θnew−θold)/Δt) is calculated by dividing a subtraction value (θnew−θold) by a time interval Δt of execution of the steering angle detection program, the subtraction value being obtained by subtracting the steering angle θ (hereinafter referred to as a last steering angle θold) input in the last execution of the program from the current steering angle θnew. After the calculation of the steering angular velocity θv, the last steering angle θold is updated, in step 408, to the current steering angle θnew for the next calculation of the steering angular velocity θv.

Then, if a negative determination "No" is made in step 410, that is, if the steering angular velocity θv is smaller than a predetermined value θ1, the routine proceeds to step 414. In step 414, the crash prediction flag PRF3 is set as "0", and the execution of the emergency steering detection program is once ended. On the other hand, if the steering angular velocity θv is equal to or greater than the predetermined value θ1, an affirmative determination "Yes" is made in step 410. Then, the crash prediction flag PRF3 is set as "1", and the execution of the emergency braking detection program is ended in step 416.

Returning now to FIG. 2, it is determined, in step 104, whether or not at least one of the crash prediction flags PRF1 through PRF3 has been set to "1". If all of the crash prediction flags PRF1 through PRF3 have been set to "0" according to the above-mentioned crash prediction process, a negative determination "No" is made in step 104, and the execution of the seatbelt tension change control program is once ended in step 122. On the other hand, when at least one of the crash prediction flags PRF1 through PRF3 has been set to "1", an affirmative determination "Yes" is made in step 104, and the routine proceeds to step 106.

Then, it is determined, in step 106, whether or not the buckle-signal detection switch 21a of the driver seat seatbelt apparatus 10A is an ON state. If the buckle-signal detection switch 21a is an OFF state (not worn), a negative determination "No" is made in step 106, and the routine proceeds to step 110. On the other hand, if the buckle-signal detection switch 21a is an ON state (worn), an affirmative determination "Yes" is made in step 106, and the routine proceeds to step 108. In step 108, the electric motor of the belt take-up device 13a is driven so that the tension of the driver seat seatbelt 11a is set to T1. That is, the electronic control unit 30 controls the rotation of the electric motor of the belt take-up apparatus 13a through the drive circuit 31a so as to operate the belt take-up device 13a so that a belt tension based on a torque detected by the belt tension sensor 22a is set to T1. Thereby, driver seat seatbelt 11a is rolled up, and the driver is constricted to the driver seat S1.

After the control of the driver seat seatbelt apparatus 10A has ended, the front passenger seat seatbelt apparatus 10b, the rear right passenger seat seatbelt apparatus 10C and the rear left passenger seat seatbelt apparatus 10D are controlled sequentially by the process of steps 110 through 120. However, in order to control each of the seatbelt apparatuses 10B, 10C and 10D on an individual seatbelt apparatus basis, the seatbelt apparatuses 10B, 10C and 10D are sequentially controlled by sequentially incrementing the parameter "m" by the process of steps 110, 118 and 112 using the parameter "m".

First, it is determined, in step 112, whether or not the buckle-signal detection switch 21b is an ON state with respect to the front passenger seat seatbelt apparatus 10B which is provided with the parameter "m"=1. If the buckle-signal detection switch 21b is an OFF state, a negative determination "No" is made in step 112, and the routine proceeds to step 118.

On the other hand, it the buckle-signal detection switch 21b is an ON state, an affirmative determination "Yes" is made in step 112, and the routine proceeds to step 114. It is determined, in step 114, whether the front passenger seat S2 is attached with a child seat. The child seat is attached to the front passenger seat S2 by being constrained with the seat belt 11b of the front passenger seat S2 with its back part or bottom part being pressed against the front passenger seat S2. In order to determine whether or not a child seat is attached, a belt tension T based on the torque detected by the belt tension sensor 22b and a weight W detected by the occupant physique (load) sensor 23b are input. If the belt tension T is equal to or greater than a predetermined tension T0 and the weight W is equal to or smaller than a predetermined weight W0, it is determined that a child seat is attached. Otherwise, it is determined that a child seat is not attached. Consequently, if a child seat it attached, an affirmative determination is made in step 114, and the routine proceeds to step 118.

On the other hand, if a child seat is not attached, a negative determination "No" is made in step 114, and the routine proceeds to step 116. In step 116, the electric motor of the belt take-up device 13b is driven so that the tension of the seat belt 11b of the front passenger seat is TZ. That is, the electronic control unit 30 controls the rotation of the belt roll-up motor 13b through the drive circuit 31b so as to operate the belt take-up device 13b so that the belt tension based on a torque detected by the belt tension sensor 22b. Thereby, the passenger seat seatbelt 11b is rolled up, thereby constraining an occupant to the front passenger seat S2. In this case, the tension T1 of the seatbelt 11a of the driver seat is smaller by a predetermined value than the tension T2 of the seatbelt 11b of the front passenger seat S2.

Similarly, the rear right seatbelt apparatus 10C and the rear left seatbelt apparatus 10D are controlled while changing the parameter "m" as "m"=2 and "m"=3. Thereafter, an affirmative determination "Yes" is made in step 118, and the routine proceeds to step 122 where the execution of the seatbelt tension change control program is ended.

As mentioned above, in the first embodiment of the present invention, when it is determined in the process of step 102 and 104 that there is a possibility of a vehicle crash, a tension applied to each of the driver seat seatbelt and the passenger seat seatbelts is increased, thereby protecting all occupants from a vehicle crash. Additionally, since the tension T1 of the driver seat seatbelt 11a is set to be smaller than the tension T2 of the seatbelts 11b-11d, an influence to a driving operation of the driver is reduced so that it is easy for the driver to continuously perform the driving operation.

Moreover, according to the above-mentioned first embodiment, the tension applied to the seatbelts 11a-11d is increased on the condition that it is determined that there is a possibility of a vehicle crash in the process of steps 102 and 104 and also wear of the seatbelts 11a-11d is detected. Therefore, when the seatbelts 11a-11d are not worn, the tension control of the seatbelts 11a-11d is prohibited by the process of steps 106 and 112. For this reason, the belt take-up devices 13a-13d are prevented from generating abnormal noise, which may occur in the control of the seatbelts 11a-11d that are not worn, and a failure in the belt take-up devices 13a-13d and a deterioration in a motor contact point can be avoided. Moreover, since the electric motor is prevented from being supplied with a motor-lock current, there is obtained an effect of reduction in power consumption.

Further, in the above-mentioned first embodiment of the present invention, a tension applied to the seatbelts 11b-11d is increased on the condition that it is determined that there is a possibility of a vehicle crash in the process of steps 102 and 104, wear of the seatbelts 11b-11d is detected in the process of step 112 and also attachment of a child seat is not detected in the process of step 114. Therefore, when the seatbelts 11a-11d are not worn, the belt take-up devices 13b-13d are prevented from generating abnormal noise, which may occur in the control of the seatbelts 11b-11d that are not worn, and a failure in the belt take-up devices 13b-13d and a deterioration in a motor contact point can be avoided. Moreover, since the electric motor is prevented from being supplied with a motor-lock current, there is obtained an effect of reduction in power consumption.

On the other hand, when a child seat is attached, an execution of the tension control of the seatbelts 11b-11d to which a child seat is not attached is prohibited in the process of step 114. Thus, the tension control of the seatbelts 11a-11d that do not require the control is prohibited, and a failure in the belt take-up devices 13b-13d and a deterioration in a motor contact point can be avoided. Moreover, since the electric motor is prevented from being supplied with a motor-lock current, there is obtained an effect of reduction in power consumption. As mentioned above, the belt tension sensors 22b-22d, the occupant physique (load) sensors 23b-23d and the process of step 114 correspond to the child seat detecting means of the present invention.

Second Embodiment

Figure 6:
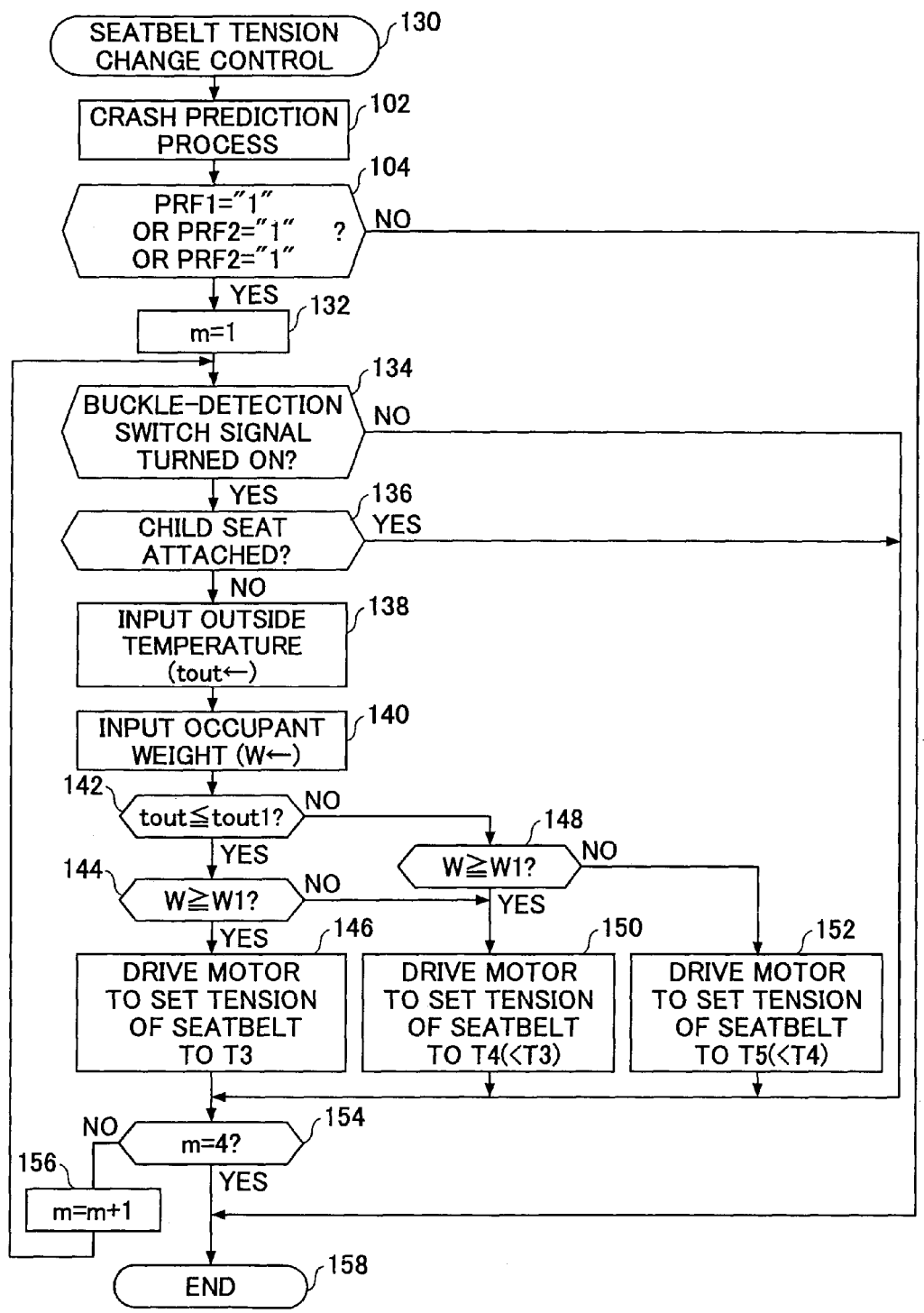
FIG. 6 is a flowchart of a seatbelt tension change control program executed by the electronic control unit shown in FIG. 1 according to the second embodiment of the present invention.

Next, a second embodiment of the present invention will be explained. The occupant protection apparatus according to the second embodiment of the present invention comprises an outside-temperature detection sensor 28 as shown in FIG. 1 by dotted lines. The outside-temperature detection sensor 28 functions as outside-temperature detecting means attached to the exterior of the vehicle for detecting an outside temperature of the vehicle, and is connected to the electronic control unit 30. Additionally, the electronic control unit 30 according to the second embodiment stores a seatbelt tension change control program of FIG. 6 instead of the seatbelt tension change control program of FIG. 2, and repeatedly executes the program for every predetermined short time. Other parts of the present embodiment are the same as the above-mentioned first embodiment, and descriptions thereof will be omitted.

A description will be given below of an operation of the occupant protection apparatus according to the second embodiment of the present invention. Also in the occupant protection apparatus of the present embodiment, upon turning on of the ignition switch, which is not shown in the figures, the electronic control unit 30 starts to repeatedly execute the seatbelt tension change control program shown in FIG. 6 for each predetermined short period of time. The execution of the seatbelt tension change control program is started in step 130, and the electronic control unit 30 performs, similar to the above-mentioned first embodiment, a crash prediction process of step 102. If all of the crash prediction flags PRF1 through PRF3 have been set to "0" according to the crash prediction process, a negative determination "No" is made in step 104, and the execution of the seatbelt tension change control program is once ended in step 158. On the other hand, when at least one of the crash prediction flags PRF1 through PRF3 has been set to "1", an affirmative determination "Yes" is made in step 104, and the routine proceeds to step 132.

In step 132, in order to control the seatbelt apparatuses 10A, 10B, 10C and 10D on an individual apparatus basis, each of the seatbelt apparatuses 10A, 10B, 10C and 10D is controlled in the process of step 132, 154 and 156 using the parameter "m" while incrementing the parameter "m" from 1 to 4. First, it is determined, in step 134, whether the buckle-signal detection switch 21a is an ON state with respect to the driver seat seatbelt apparatus 10A which corresponds to "m"=1. If the buckle-signal detection pilot-switch 21a is an OFF state, a negative determination "No" is made in step 134, and the routine proceeds to step 154.

On the other hand, if the buckle-signal detection switch 21a is an ON state, an affirmative determination "Yes" is made in step 134, and the routine proceeds to step 136. In step 136, it is determined whether a child seat is attached to the driver seat S1. Since a child seat is never attached to the driver seat S1, a negative determination "No" is made in step 136, and the routine proceeds to step 138. In step 138, an outside temperature tout detected by the outside-temperature detection sensor 28 is input. Next, a weight W of the driver detected by the occupant physique (load) sensor 23a is input in step 140.

Then, it is determined, in step 142, whether or not the outside temperature tout is equal to or lower than a predetermined temperature tout1. If the outside temperature tout is equal to or lower than the predetermined temperature tout1, it is assumed that the driver wears winter clothes (wear a lot of clothes). In this case, in order to sufficiently remove the slack of the seatbelt 11a of the driver seat, the tension applied to the seatbelt 11a of the driver seat is increased. It is considered that a force required for the seatbelt 11a to constrain a driver to the driver seat S1 is proportional to the weight of the driver. Therefore, if, the weight W of the driver is equal to or greater than a predetermined weight W, the electric motor of the belt take-up device 13a is driven through the drive circuit 31a in the process of steps 144 and 146 so that the tension of the seatbelt 11a of the driver seat is set to T3 (large).

On the other hand, if the weight W of the driver is smaller than the predetermined weight W1, in order to prevent an excessive binding load to the driver, the electric motor of the belt take-up device 13a is driven through the drive circuit 31a in the process of steps 144 and 150 so that the tension applied to the seatbelt 11a of the driver seat is set to T4 (middle).

If the outside temperature tout is higher than the predetermined temperature tout1 in step 142, it is assumed that the driver does not wear winter clothes (not wear a lot of clothes) and the tension applied to the seatbelt 11a of the driver seat is increased. In this case, however, since there is no need to remove a slack of the seatbelt 11a, the tension applied to the seatbelt 11a is smaller than the seatbelt tension T3. Since it is considered that a force to constrain the driver to the driver seat by the seatbelt 11a of the driver seat is proportional to the weight of the driver, if the weight W of the driver is equal to or larger than the predetermined weight W1, the electric motor of the belt take-up device 13a is driven through the drive circuit 31a in the process of steps 148 and 150 so that the tension applied to the seatbelt 11a of the driver seat is set to T4 (middle).

On the other hand, if it is determined in step 148 that the weight W of the driver is smaller than the predetermined weight W1, in order to prevent an excessive binding load to the driver, the electric motor of the belt take-up device 13a is driven through the drive circuit 31a in the process of steps 148 and 152 so that the tension applied to the seatbelt 11a of the driver seat is set to T5 (small).

In the above-mentioned case, the seatbelt tension T4 is smaller than the seatbelt tension T3 by a predetermined amount, and the seatbelt tension T5 is smaller than the seatbelt tension T4 by a predetermined amount. That is, an electric current value supplied to the electric motor of the belt take-up device 13a decreases in turn as the seatbelt tension decreases as T3, T4, T5 in turn.

After controlling the seatbelt apparatuses 10B 10C, and 10D while changing "m"=2, 3, 4 in the same manner, an affirmative determination "Yes" is made in step 154, and the routine proceeds to step 158 so as to end the execution of the seatbelt tension change control program. However, in the process of step 136 for each of the seatbelt apparatuses 10B, 10C and 10D, similar to the process of step 114 explained with reference to FIG. 2, it is determined that a child seat is attached if the belt tension T is equal to or larger than a predetermined tension T0 and also the weight W is equal to or smaller than a predetermined weight W0. In other cases, it is determined that a child seat is not attached. Then, if a child seat is attached, an affirmative determination "Yes" is made in step 136, and the routine proceeds to step 154. That is, it is determined in step 136 whether or not a child seat is attached on the condition that it is determined whether or not it is a process for the driver seat seatbelt apparatus 10A and a determination is made that the process is not for the driver seat seatbelt apparatus 10A.

As mentioned above, according to the second embodiment of the present invention, in addition to the protection of occupants when a vehicle crash occurs and the effect acquired by the prohibition of the seatbelt tension control by the process of steps 134 and 136, the tension applied to the seatbelts 11a-11d when the outside temperature tout is high is increased as compared to the tension when the outside temperature tout is low by the process of steps 142, 146 and 150 in accordance with the outside temperature tout detected by the outside-temperature detection sensor 28. In a case where an occupant wears winter clothes, a time period for removing a slack of the seatbelt is longer than usual due to a compression of the clothes even if the seatbelt tension is increased. For this reason, there is a possibility that a slack of the seatbelt may no be sufficiently removed if the seatbelt tension is increased with the same condition as the case where the occupant does not wear winter clothes. Thus, according to the detected outside temperature tout, it is assumed that the occupant wears wither clothes when the outside temperature tout is low and the tension applied to the seatbelts 11a-11d is increased. Therefore, the tension applied to the seatbelts 11a-11d can be increased while sufficiently removing a slack of the seatbelts 11a-11d, which results in appropriate protection of occupants while the thickness of clothes is also taken into consideration.

Additionally, according to the second embodiment of the present invention, in addition to the protection of occupants which also considers the thickness of clothes, the tension applied to the seatbelts 11a-11d when the weight W of an occupant is small is decreased as compared to a case where the weight W is large by the process of steps 144, 146, 148, 150 and 152 in accordance with the detected weight W (detected physique). That is, it is considered that a force required to constrain an occupant to each of the seats S1-S4 with the corresponding seatbelts 11a-11d is proportional to the weight of the occupant. Accordingly, when an occupant is a child and if the tension applied to each of the seatbelts 11a-11d is uniformly increased in the same manner as a case where the occupant is an adult, there is a possibility that too much binding load is applied to the child, which may result in insufficient protection to the child. Thus, the tension of the seatbelts 11a-11d is decreased when the weight of the occupant is small in response to the detected weight W. Thereby, each occupant can be appropriately protected in accordance with their weight.

Third Embodiment

Figure 7:
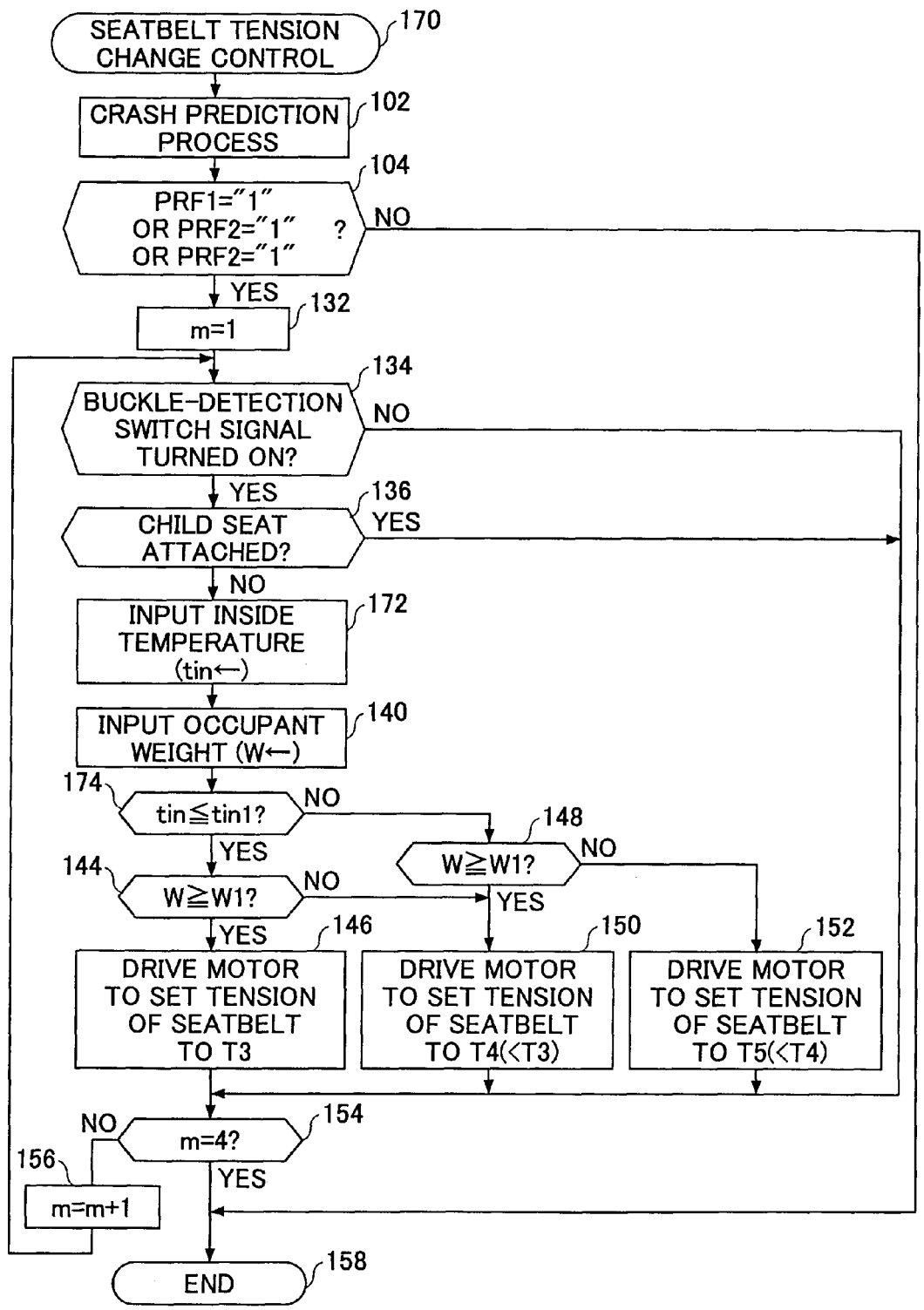
FIG. 7 is a flowchart of a seatbelt tension change control program executed by the electronic control unit shown in FIG. 1 according to the third embodiment of the present invention.

Next, a third embodiment of the present invention will be explained. The occupant protection apparatus according to the second embodiment of the present invention comprises an inside-temperature detection sensor 29 as shown in FIG. 1 by dotted lines instead of the outside-temperature detection sensor 28. The inside-temperature detection sensor 29 functions as inside-temperature detecting means attached to the interior of the vehicle for detecting an inside temperature of the vehicle, and is connected to the electronic control unit 30. Additionally, the electronic control unit 30 according to the third embodiment stores a seatbelt tension change control program of FIG. 7 instead of the seatbelt tension change control program of FIG. 6, and repeatedly executes the program for every predetermined short time. The seatbelt tension change control program of FIG. 7 executes the process of steps 172 and 174 instead of the process of steps 138 and 142 of the seatbelt tension change control program according to the above-mentioned second embodiment.

A description will be given below of an operation of the occupant protection apparatus according to the third embodiment of the present invention. Also in the occupant protection apparatus of the present embodiment, upon turning on of the ignition switch, the electronic control unit 30 starts to repeatedly execute the seatbelt tension change control program shown in FIG. 7 for each predetermined short period of time. The execution of the seatbelt tension change control program is started in step 170, and the electronic control unit 30 performs the process of steps 102 through 136 that is the same as the above-mentioned second embodiment. If it is determined, in step 136, that the a child seat is not attached, a negative determination "No" is made in step 136, and the routine proceeds to step 172. In step 172, the inside temperature tin detected by the inside-temperature detection sensor 29 is input. Then, the occupant's weight W is input in step 140, and the routine proceeds to step 174. It is determined, in step 174, whether or not the inside temperature tin is equal to or lower than a predetermined temperature tin1. If the inside temperature tin is equal to or lower than the predetermined temperature tin1, the routine proceeds to step 144. On the other hand, if the internal temperature tin is higher than the predetermined temperature tin1, the routine proceeds to step 148. The process of subsequent steps 144-158 is the same as that of the second embodiment, and descriptions thereof will be omitted.

According to the third embodiment of the present invention, the tension of the seatbelts 11a-11d when the inside temperature is high is increased as compared to that of a case where the inside temperature tin is low by the process of steps 174, 146, 150 in accordance with the inside temperature tin detected by the inside-temperature detection sensor 29. Although it differs from the assumption based on the outside temperature tout as is in the process of step 142 according to the second embodiment with respect to the assumption in the process of step 174 that an occupant wears winter clothes when the inside temperature tin is low, the present embodiment is the same as the second embodiment in that tension of the seatbelts 11a-11d when the inside temperature tin is low is increased as compared to that of a case where the inside temperature tin is high by the process of steps 146 and 150 in accordance with the detected inside temperature tin, and the tension of the seatbelts 11a-11d when the assumption is made that the occupant wears winter clothes when the inside temperature tin is low is increased as compared to that of a case where the occupant does not wear winter clothes. Therefore, also in the present embodiment, each occupant is appropriately protected while the thickness of clothes is also taken into consideration. Moreover, the present embodiment is the same as the second embodiment in that each occupant can be appropriately protected in response to their weight by decreasing the tension of the seatbelts 11a-11d when the weight W is small is decreased as compared to that of a case where the weight W is large by the process of the steps 144, 146, 148, 150 and 152 in accordance with the detected weight W.

Other Embodiments

The occupant protection apparatuses according to the first through third embodiments were explained above. However, the occupant protection apparatus according to the present invention is not limited to the first through third embodiments, and various variations may be made without departing from the scope of the present invention.

For example, in the second embodiment, the description was give of the occupant protection apparatus that uses the outside-temperature detection sensor 28 as the outside-temperature detecting means, and the tension of the seatbelts 11a-11d is increased in accordance with the detected outside temperature tout alone when the outside temperature tout is equal to or lower than the predetermined temperature tout1. Additionally, in the third embodiment, the description was given to the occupant protection apparatus that uses the inside-temperature detection sensor 29 as inside temperature detecting means, and the tension of the seatbelts 11a-11d is increased in accordance with the detected inside temperature tin alone when the inside temperature tin is equal to or lower than the predetermined temperature tin1. However, the occupant protection apparatus according to the present invention may use both the outside-temperature detection sensor 28 and the inside-temperature detection sensor 29 simultaneously so as to increase the tension of the seatbelt 11a-11d when an affirmative determination "Yes" is made in the process of determining whether or not the outside temperature tout is equal to or lower than the predetermined temperature tout1 and whether or not the inside temperature tin is equal to or lower than the predetermined temperature tin1. In this case, the probability in the assumption that an occupant wears wither clothes (wears a lot of clothes) can be increased, and, thus, protection of the occupant can be surely attempted while the thickness of the clothes is taken into consideration.

Additionally, in the second and third embodiments, descriptions were given as to the occupant protection apparatuses that increase the tension of the seatbelts 11a-11d when the outside temperature tout is equal to or lower than the predetermined temperature tout1 or the inside temperature tin is equal to or lower than the predetermined temperature tin1. However, the present invention is not limited to the apparatus performing such a process, and the seatbelt tension T may be determined in response to the outside temperature tout or the inside temperature tin. Specifically, a seatbelt tension table is prepared and stored in the electronic control unit 30. The seatbelt tension table represents a relationship between the outside temperature tout (inside temperature tin) and the seatbelt tension T wherein the seatbelt tension T increases as the outside temperature tout (inside temperature tin) decreases. Then, the electronic control unit 30 determines the seat belt tension T corresponding to the outside temperature tout (inside temperature tin) by referring to the seat belt tension table. According to this embodiment, the tension of the seatbelts is increased in accordance with the outside temperature tout (inside temperature tin) when the outside temperature tout (inside temperature tin) is low as compared to that of a case where the outside temperature tout (inside temperature tin) is high. Therefore, also in this case, appropriate protection to each occupant can be attempted while the thickness of clothes is taken into consideration.

Moreover, although in the above-mentioned first through third embodiments, the occupant physique (load) sensors 23a-23d are used as the physique detecting means, the present invention is not limited to such a sensor, and, for example, any one of the followings may be used: assuming a physique by detecting a weight of an occupant from a pressure inside a bag which is filled with a liquid and placed inside a seating surface of a seat; assuming a physique of an occupant from a surface pressure distribution when the occupant seats by inserting a film provided with a lot of pressure sensors into inside of the seat; assuming a physique of an occupant from changes in an electrostatic capacity by arranging a cloth-like antenna in a seat; assuming a physique of an occupant in a front seat from a position of the seat along a front-to-rear direction; and assuming a physique by an image take by a camera.

Further, although the belt tension sensors 22b-22d and the occupant physique (load) sensors 23b-23d are used as an example of the child seat detecting means in the first through third embodiments, the preset invention is not limited to such a sensor and any one of the followings may be used: detecting a child seat from a surface pressure distribution obtained by many pressure sensors; assuming an existence of a child seat by measuring changes in an electrostatic capacity; and detecting a child seat by an image taken by a camera.

The present invention is not limited to the specifically disclosed embodiments, and variations and modifications may be made without departing from the scope of the present invention.

The present application is based on Japanese priority application No. 2002-309146 filed Oct. 24, 2002, the entire contents of which are hereby incorporated by reference.

What is claimed is:

1. An occupant protection apparatus for a vehicle, comprising:
   driver-seat seatbelt tension changing means for changing a tension applied to a driver-seat seatbelt provided to a driver seat of the vehicle;
   passenger-seat seatbelt tension changing means for changing a tension applied to a passenger-seat seatbelt provided to a seat other than said driver seat;
   crash predicting means for predicting a crash of said vehicle; and
   belt tension controlling means for controlling said driver-seat seatbelt tension changing means and said passenger-seat seatbelt tension changing means so as to increase the tension applied to each of said driver-seat seatbelt and said passenger-seat seatbelt when said crash predicting means determines that there is a possibility of a vehicle crash, and set the tension applied to said driver-seat seatbelt to always be smaller than the tension applied to said passenger-seat seatbelt.

2. The occupant protection apparatus as claimed in claim 1, further comprising belt wear detecting means for detecting wear of each of said driver-seat seatbelt and said passenger-seat seatbelt, and wherein said belt tension controlling means further controls said driver-seat seatbelt tension changing means and said passenger-seat seatbelt tension changing means, when said crash predicting means judges that there is a possibility of vehicle crash and also when said belt wear detecting means detects wear of each of said driver-seat seatbelt and said passenger-seat seatbelt, so as to increase the tension applied to each of the driver-seat seatbelt and the passenger-seat seatbelt.

3. The occupant protection apparatus as claimed in claim 1, further comprising physique detecting means for detecting physique of an occupant, and wherein said belt tension controlling means further controls said driver-seat seatbelt tension changing means and said passenger-seat seatbelt tension changing means based on the physique detected by said physique detecting means so that the tension applied to each of said driver-seat seatbelt and passenger-seat seatbelt is set to be smaller as the detected physique is larger.

4. The occupant protection apparatus as claimed in claim 1, further comprising belt wear detecting means for detecting wear of each of said driver-seat seatbelt and said passenger-seat seatbelt and child seat detecting means for detecting attachment of a child seat to said seat other than said driver seat, and wherein said belt tension controlling means further controls said driver-seat seatbelt tension changing means and said passenger-seat seatbelt tension changing means, when said crash predicting means judges that there is a possibility of vehicle crash and also when said belt wear detecting means detects wear of each of said driver-seat seatbelt and said passenger-seat seatbelt and further when said child seat detecting means does not detect attachment of said child seat, so as to increase the tension applied to each of the driver-seat seatbelt and the passenger-seat seatbelt.

5. A seatbelt tension control method of controlling a tension applied to seatbelts of a vehicle, the method comprising:

predicting a crash of said vehicle;

judging whether a driver-seat seatbelt provided to a driver seat is worn;

increasing the tension applied to said driver-seat seatbelt when there is a possibility of a vehicle crash and also when said driver-seat seatbelt is worn;

judging whether a seatbelt provided to a seat other than said driver seat is worn; and increasing the tension applied to said seatbelt provided to said seat other than said driver-seat seatbelt when there is a possibility of a vehicle crash and also when said seatbelt provided to said seat other than said driver-seat seatbelt is worn, and set the tension applied to said driver-seat seatbelt to always be smaller than the tension applied to said passenger-seat seatbelt.

6. The seatbelt tension control method as claimed in claim 5, further comprising:

detecting attachment of a child seat to said seat other than said driver seat; and prohibiting an increase in the tension applied to said seatbelt provided to said seat other than said driver-seat.

* * * * *